Aug. 11, 1959   F. H. BRAY ET AL   2,899,500
TIMING EQUIPMENT
Filed Sept. 10, 1953   20 Sheets-Sheet 3
FIG. 3A.
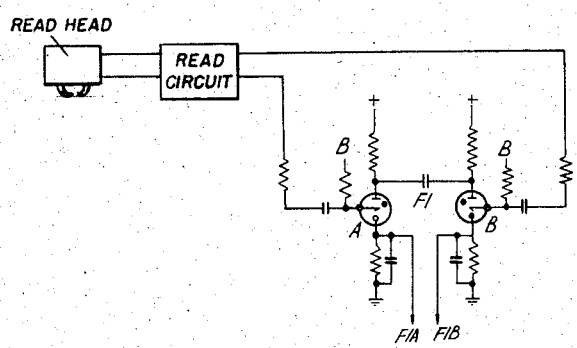
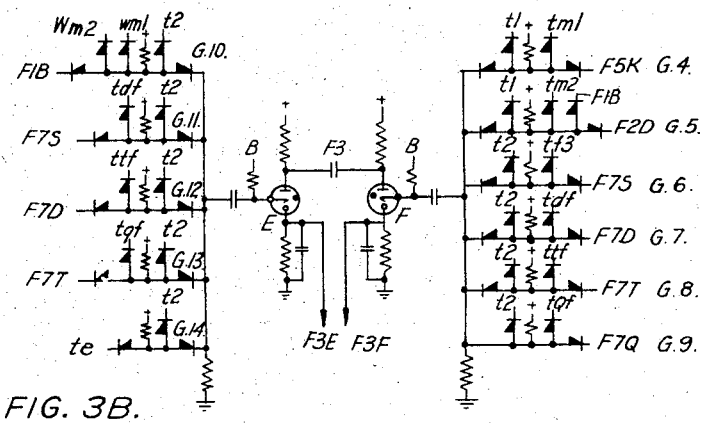
FIG. 3B.
FIG. 3C.
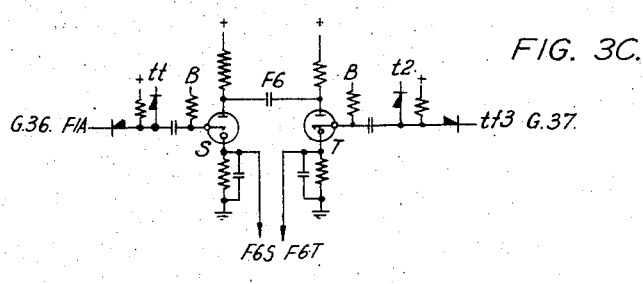
Inventor
F. H. BRAY - P. M. KING
J. RICE
By
Attorney Aug. 11, 1959   F. H. BRAY ET AL   2,899,500
TIMING EQUIPMENT
Filed Sept. 10, 1953   20 Sheets-Sheet 4
*FIG. 4A*
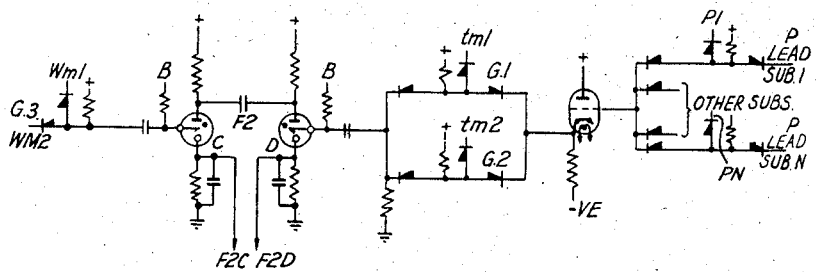
*FIG. 4B.*
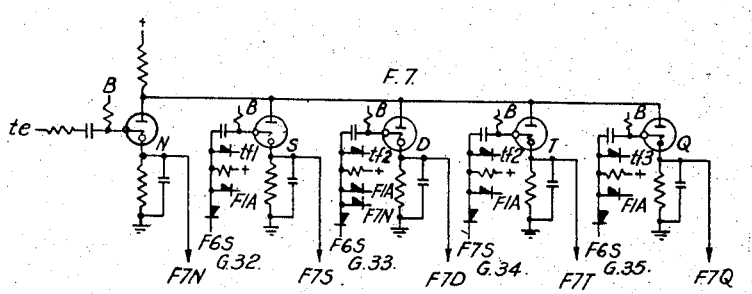
*FIG. 4C.*
Inventor
F. H. BRAY - P. M. KING -
J. RICE
By
Attorney Aug. 11, 1959　　F. H. BRAY ET AL　　2,899,500
TIMING EQUIPMENT Filed Sept. 10, 1953　　20 Sheets-Sheet 5

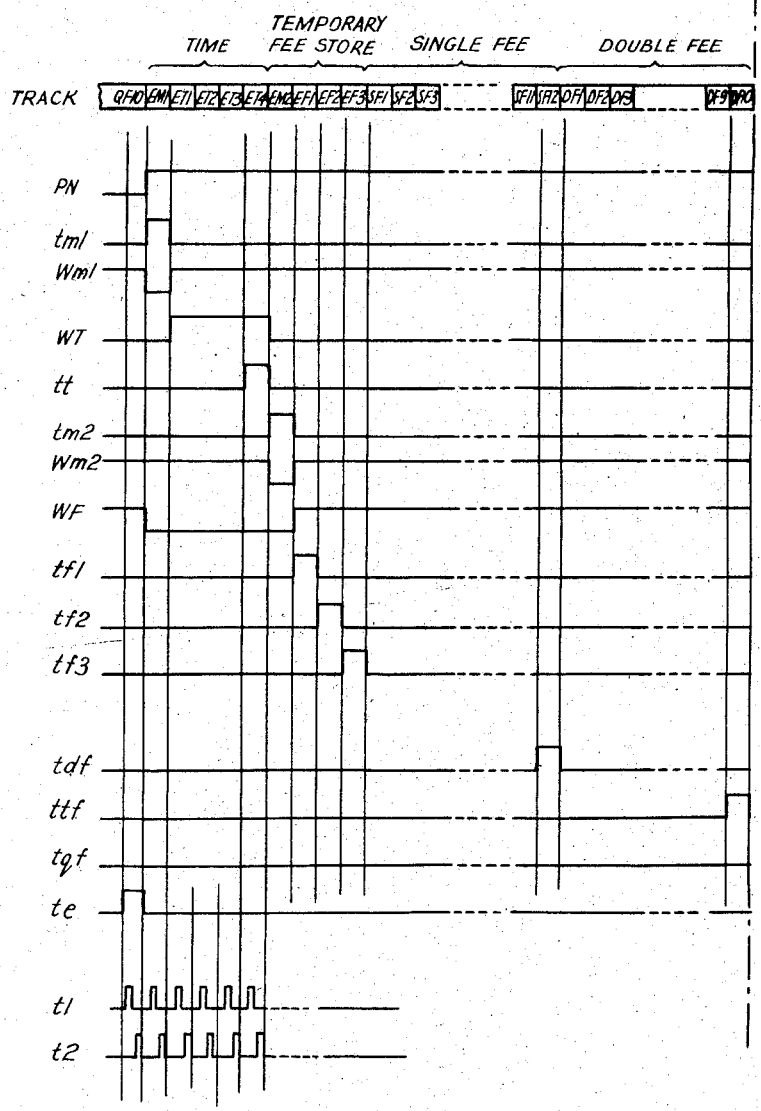

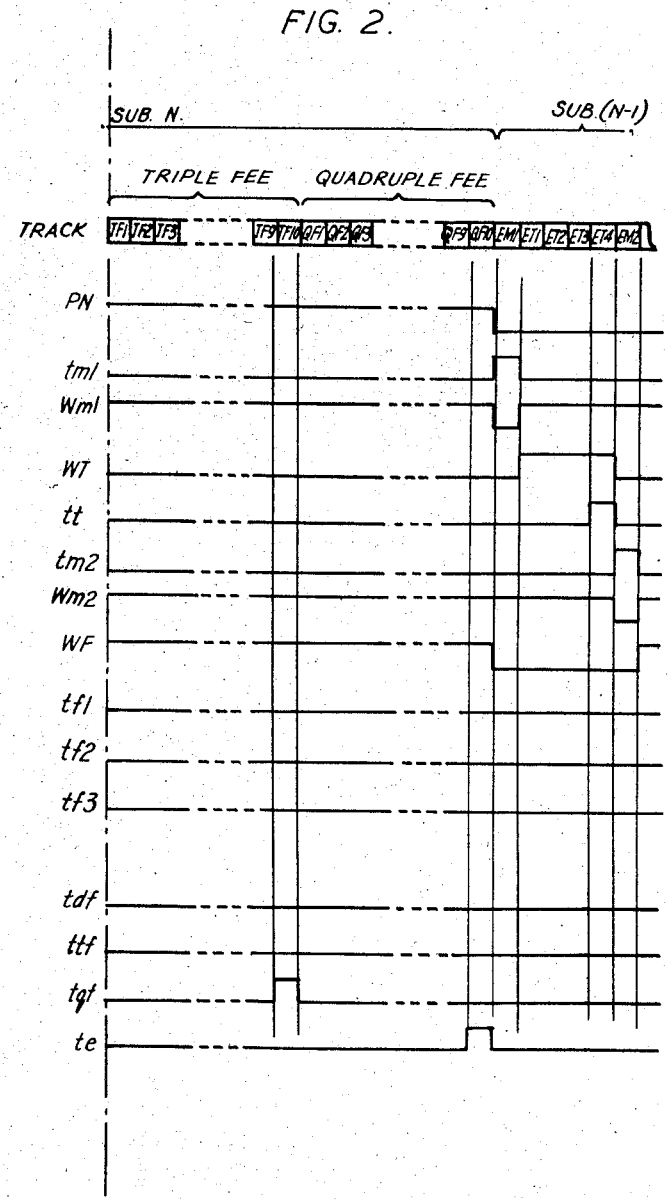

Inventor
F. H. BRAY · P. M. KING ·
J. RICE
By
Robert Harding Jr.
Attorney

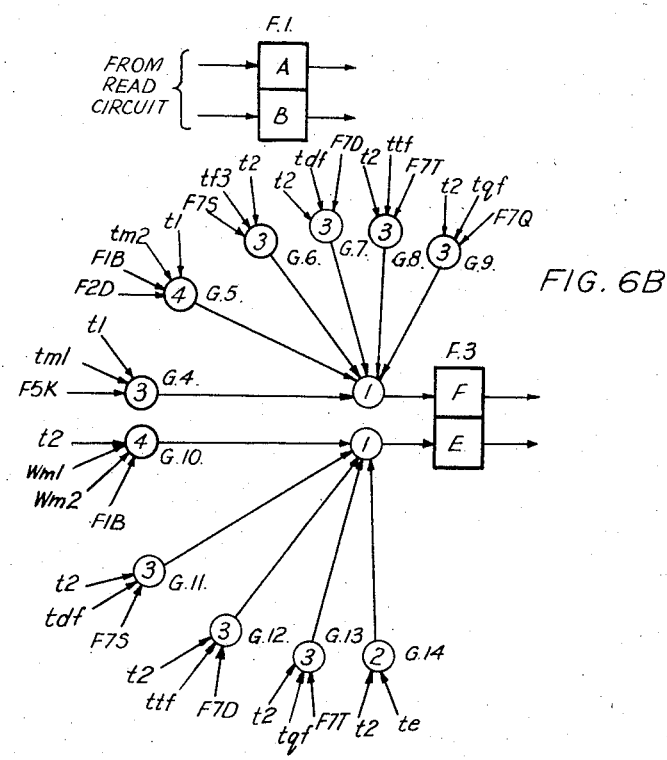
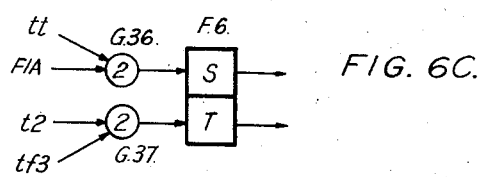

Aug. 11, 1959  F. H. BRAY ET AL  2,899,500
TIMING EQUIPMENT

Filed Sept. 10, 1953  20 Sheets-Sheet 13

Inventor
F. H. BRAY- P. M. KING-
J. RICE
By
Attorney

FIG. 15.

United States Patent Office 2,899,500
Patented Aug. 11, 1959

2,899,500

TIMING EQUIPMENT

Frederick Harry Bray, Peter Morris King, and Joseph Rice, London, England, assignors to International Standard Electric Corporation, New York, N.Y.

Application September 10, 1953, Serial No. 379,373

Claims priority, application Great Britain September 19, 1952

8 Claims. (Cl. 179—7)

The present invention relates to timing equipment.

According to the present invention there is provided timing equipment which comprises a store, means for examining said store periodically, external means associated with said store, a control circuit associated with said store and with said external means, and means in said control circuit responsive to said external means assuming a predetermined condition to control a count by said store of the number of successive examinations of said store while said external means is in said predetermined condition.

According to the present invention there is further provided timing equipment which comprises a number of stores, means for examining said stores periodically and successively, a number of external means each of which is associated with one of said stores, a control circuit associated with all of said stores and with all of said external means and arranged to co-operate with said stores singly and successively and with said external means singly and successively, and means in said control circuit responsive to one of said external means assuming a predetermined condition to control a count by the associated store of the number of successive examinations of said store while that external means is in said predetermined condition.

According to the present invention there is further provided timing equipment which comprises a store formed by an endless track of magnetic material on which intelligence can be recorded, recording and reading means associated with said track, said track being movable with respect to said recording and reading means, whereby said track is repeatedly examined by said recording and reading means, external means associated with a predetermined portion of said track, a control circuit associated with said recording and reading means and with said external means, and means in said control circuit responsive to said external means assuming a predetermined condition to control a count of the number of successive examinations of said predetermined portions of the track by said recording and reading means while said external means is in said predetermined condition.

According to the present invention there is still further provided timing equipment which comprises an endless track of magnetic material on which intelligence can be recorded, recording and reading means associated with said track, said track being movable with respect to said recording and reading means and being divided into a number of portions forming separate stores which appear at said recording and reading means successively, whereby said stores are repeatedly examined by said recording and reading means, a number of external means each of which is associated with one of said stores, a control circuit associated with said recording and reading means and with all of said external means, and arranged to co-operate with said stores singly and successively and with said external means singly and successively, and means in said control circuit responsive to one of said external means assuming a predetermined condition to control a count of the number of successive examinations of the store with which that external means is associated by said recording and reading means while that external means is in said predetermined condition.

Briefly one embodiment of the invention comprises four permanent stores for storing records of single fee, double fee, treble fee, and quadruple fee telephone calls. There is one set of these permanent stores for each subscriber and the subscribers' lines are connected in succession to the sets of stores. Whether a call is a single fee, double fee, treble fee, or quadruple fee call will be determined by the corresponding number of metering pulses which appear in succession on the subscriber's line. In addition to the permanent stores of each set, there is also a temporary store and a timing store. The temporary store receives and registers the number of metering pulses. The timing store is provided solely for the purpose of allowing enough time to elapse after the initiation of a metering pulse to receive another pulse which may appear on the subscribers' line. When such time has elapsed without the receipt of another metering pulse, the timing store controls the transfer of the number of metering pulses already registered in the temporary store from that store to a memory device which then adds a "1" to the total number already recorded in the particular permanent store corresponding to this number of metering pulses.

The term store as used in this specification means a device in which intelligence can be recorded by creating internal strains in the material of the store, and in which stored intelligence can be detected by detecting the state of the strain in the material.

Examples of internal strains which are used to store intelligence are magnetisations of either one of two polarities, as in the magnetic drum, tape or wire, or in the static magnetic matrix, electrifications of either one of two polarities as in the ferroelectric storage matrix, electric charges of either one of two polarities as in the cathode ray tube storage device, and compression waves as in acoustic delay lines such as mercury delay lines and magnetostrictive delay lines.

The term store as used in the present specification and in the claims appended thereto should therefore be interpreted to include any device falling within the terms of this definition, and in any case includes all of the examples listed in the preceding paragraph.

The invention will now be described with reference to the accompanying drawings, which show a multi-fee metering system for use in an automatic telephone exchange system, and in which:

Figs. 1 and 2, which should be placed side by side, show the track lay-out and associated pulse cycles of a peripheral track on a magnetic drum, which track is capable of storing the metering records of a number of telephone subscribers. Each record section comprises timing pulse positions, a temporary fee store for checking the value of a metering condition to be recorded, and permanent fee stores for single, double, treble and quadruple fees respectively.

Figs. 3A, 3B, 3C, 4A, 4B, 4C, and 5 together show detailed circuits of a common equipment controlling storage and storage modification on a drum track.

Figs. 6A, 6B, 6C, 7A, 7B, 7C, and 8 together show so-called functional symbol diagrams exactly corresponding to Figs. 3A, 3B, 3C, 4A, 4B, 4C, and 5.

Figs. 9 to 20 show the sequence of operations of the flip-flops F1–F7 of the circuits shown in Figs. 3A to 8 during successive rotations of the magnetic drum during metering and for different metering conditions.

As has been stated the present invention relates to timing equipment. The multi-metering system which is described and shown uses the timing means according to the invention to determine the duration of a metering condition. From the duration of this metering condition the equipment determines what sort of fee it represents. It is therefore felt that the whole system should be described in the interest of clarity.

In present metering schemes, calls, whether of the single or multi-fee type are registered on mechanical meters in terms of single fee units, the resulting total giving no indication of the type of calls that have been made, only their value in single fee units. In the circuit about to be described, a pulse multiplex system is used to scan the P leads of a number of subscribers line circuits, and if the P lead of a line circuit is found in a metering condition, to record this fact on a magnetic drum in the manner described in the application of E. P. G. Wright et al., Serial No. 289,383, filed May 22, 1952, now Patent No. 2,838,745.

The system described makes provision for making separate records for calls to be charged differently. In the embodiment shown in Figs. 1–20 the method used, is to divide each track of the drum into a number of sections. Each section is associated by means of the multiplex or position pulse as it is called, with a particular subscribers line circuit. These track sections are then subdivided as follows: The first subdivision is used as a timing section and includes sections EM1, ET1 to ET4. Subdivision two is used as a temporary store for single or multi-fee pulses occurring in one metering operation and includes sections EM2, EF1 to EF3. The permanent record stores then follow the temporary store in order of magnitude, the store of least significance first. These stores include single fee sections SF1 to SF12, double fee sections DF1 to DF10, triple fee sections TF1 to TF10, and quadruple fee sections QF1 to QF10.

The arithmetic technique for counting meter pulses or drum revolutions, uses a binary form of numbering, the digit of least significance appearing at the read head first. If it is desired to make an addition of one, then all elements forming the binary number are reversed, up to and including the first "0." Following elements are then repeated unchanged, e.g.

| Decimal | Binary |
| --- | --- |
| 7= | 00111 |
| +1=8= | 01000 |
| +1=9= | 01001 etc. etc. |

Intelligence stored in the temporary fee store, at a time controlled by the timing section, is transferred to the appropriate permanent store. At the same time, as the transfer takes place, the temporary fee store intelligence is erased. This leaves the store ready to accept further information, and the appropriate permanent store intelligence greater by "1." The timing store is so arranged that when a transition of the P lead condition occurs, all previous timing informations are erased and timing re-started from "0." Thus if the point at which fee transfer takes place is, say, twice the period of the longest meter pulse, or inter-pulse period, the transfer circuit cannot operate until the particular pulse or pulse train has ceased.

*General description of drawings of the first embodiment*

In Figs. 3A–8, F1 is a read flip-flop which responds to the intelligence drawn from the track of the drum by a read head. The A side conducting indicates the track condition is such that a "1" is stored, the B side conducting, indicating a "0."

F2 is a flip-flop which indicates to the control circuit, the condition of the particular "P lead" connected to the circuit F2 at that time under control of one of the pulses P1 to PN. When the D side of F2 is conducting, it shows the presence of a meter pulse on the connected P lead. The C side conducting denotes the absence of a meter pulse or that the flip-flop has been re-set from indicating such a pulse.

Flip-Flop F3 is part of the addition circuit, and is arranged so that, with the F side conducting, the drum intelligence indicated by read flip-flop F1, shall be reversed by the recording circuit. With the E side conducting the intelligence shall be recorded unchanged.

F4 is a record flip-flop which, with its associated gates, is arranged to control whether the intelligence recorded shall be digit "1" or digit "0." G side conducting records digit "1," and H conducting records digit "0."

Flip-flop F5 shows when the J side is conducting that a transition has occurred on the connected "P lead." The K side conducting indicates that the "P lead" condition is stable.

F6 is operated by the intelligence in the time store reaching a critical value, such that element ET4 is "1." This condition in conjunction with a $tt$ pulse to be later described causes F6 to conduct on the S side and initiate the temporary fee store intelligence transfer. After initiating this function it is re-set to the T side.

F7 is in effect a five position multi-stable register, each element of which is particular to a permanent fee store. Thus when transfer occurs, the intelligence in the temporary fee store causes the appropriate element to conduct. Information in the temporary fee store can thus be erased, F7 retaining this intelligence until the appropriate track section arrives at the record head. Operation of the five elements give the following indications:

N=normal condition.
S=indicates single fee store.
D=indicates double fee store.
T=indicates treble fee store.
Q=indicates quadruple fee store.

*Waveforms*

The waveforms shown in Figs. 1 and 2 are all developed from a toothed track on the drum and have the following functions: $tm1$ initiates circuit operations peculiar to the first element of the timing section EM1, and is one of the control waves for the timing section. $Wm1$ is an inversion of $tm1$. WT, along with $tm1$, are the master control waveforms for the period during which the timing section of the track is in operation. The following gates associated with the timing circuit and identified in Figs. 3A to 8 are inoperative without one of these two waveforms; gates G1, G4, G15, G16, G17, G18, G19, G20, G21, G25, G26, G27 and G28. Thus in the ensuing circuit description, when discussing fee transfer and temporary fee store circuit operation, it will be understood that all these gates are inoperative.

Waveform $tt$ initiates the temporary fee transfer in conjunction with element ET4; $tm2$, similarly to $tm1$, is peculiar to the circuit functions associated with the first element EM2 of the temporary fee section, and is also one of the control waveforms of the temporary fee, fee transfer, and permanent fee store circuit functions. Waveform $Wm2$ is an inversion of $tm2$, and in conjunction with $Wm1$ holds certain gates inoperative during the elements in which waveforms $tm1$ and $tm2$ are operative, the gates being G3 and G10. Waveform WF, in conjunction with $tm2$, forms the master control waveform for the circuit functions mentioned under $tm2$.

The gates associated with these circuit functions which must be considered inoperative when waveforms $tm2$ and WF are not present are; G2, G5, G22, G23, G24, G29, G30 and G31.

Waveform $tf1$, in conjunction with a "1" being stored on element EF1 in the temporary fee store, will cause section S of F7 to conduct at the time of fee transfer.

Waveform $tf2$, with "1" stored on element EF2 of the temporary fee store only, will cause section D of F7 to conduct at the time of free transfer. If "1" has been stored on EF1, as well as EF2, it will cause section T of F7 to conduct.

Waveform $tf3$ controls fee transfer into the quadruple fee store in conjunction with element EF3. Also resets F6.

Depending upon the section of F7 which is conducting, the four pulses tf3, tdf, ttf, tqf cause the addition circuit to modify the intelligence in the single double, treble and quadruple store respectively. Pulse tf3 could be called tsf but as the position occupied by the two pulses is identical tf3 has been used for both functions.

Pulse te is a pulse which occurs at the end of the track section to denote the completion of the track reading.

Switching pulses t1, t2 are narrow pulses which initiate the various circuit operations within the period of one storage element.

Detailed description of first embodiment

The ensuing description applies equally well to both the detailed circuits of Figs. 3A–5, and the functional diagrams of Figs. 6A–8. For the purposes of the description the following "P lead" and drum conditions have been assumed, as indicated in connection with each of Figs. 9–20 which show the cathode output waveforms of the individual tubes of the flip-flops F1 to F7 under these conditions.

Figure 5:
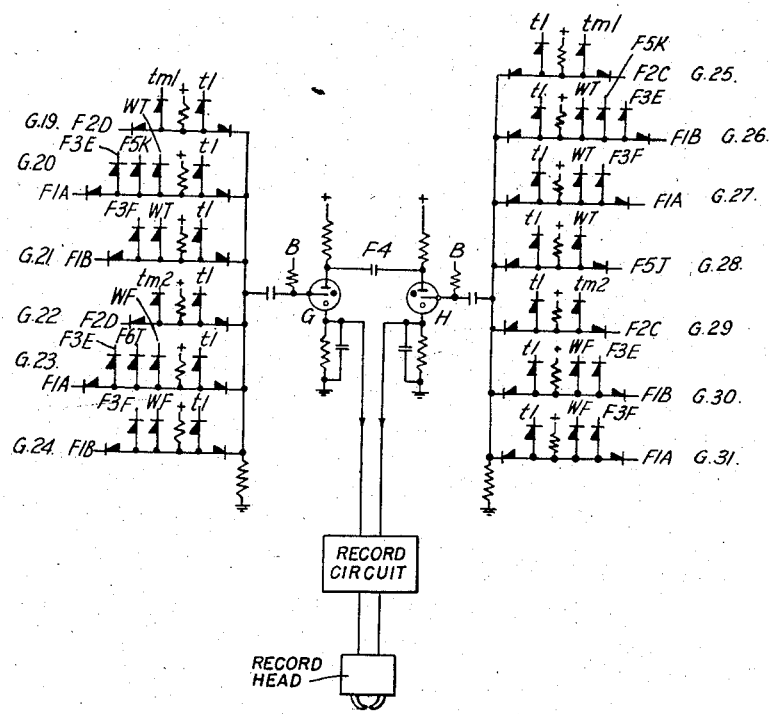
Figure 7A:
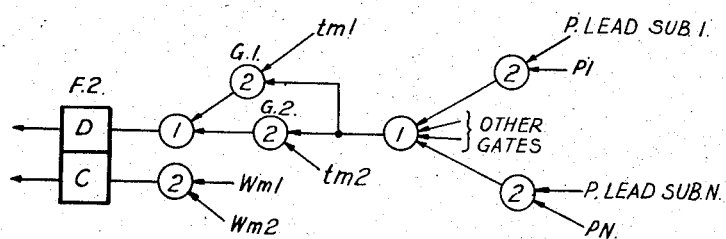
Figure 7B:
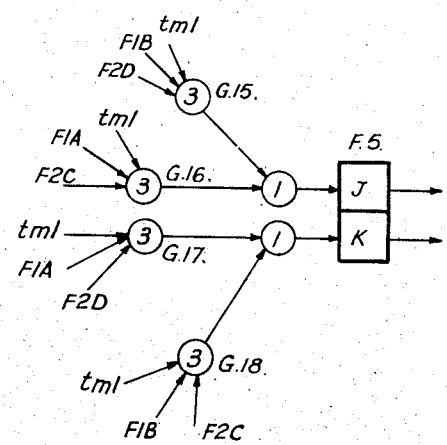
Figure 7C:
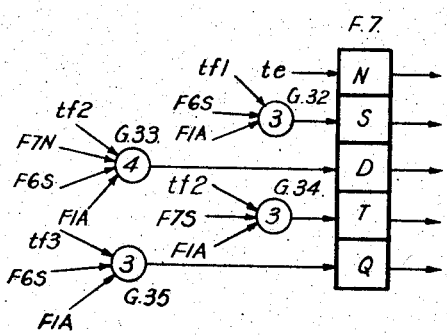
Figure 8:
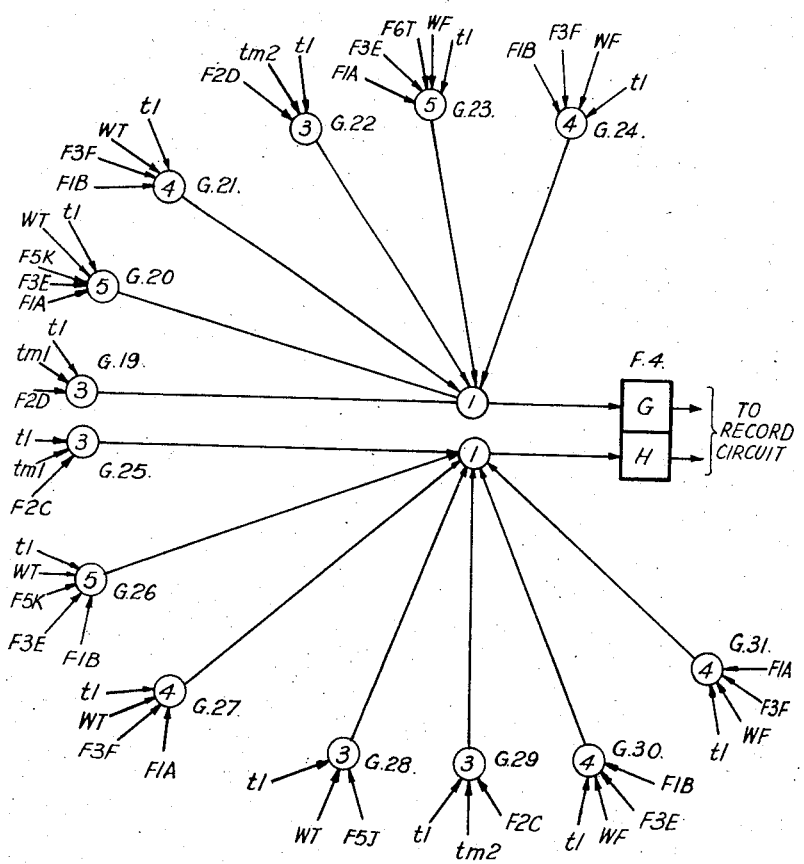
Figure 9:
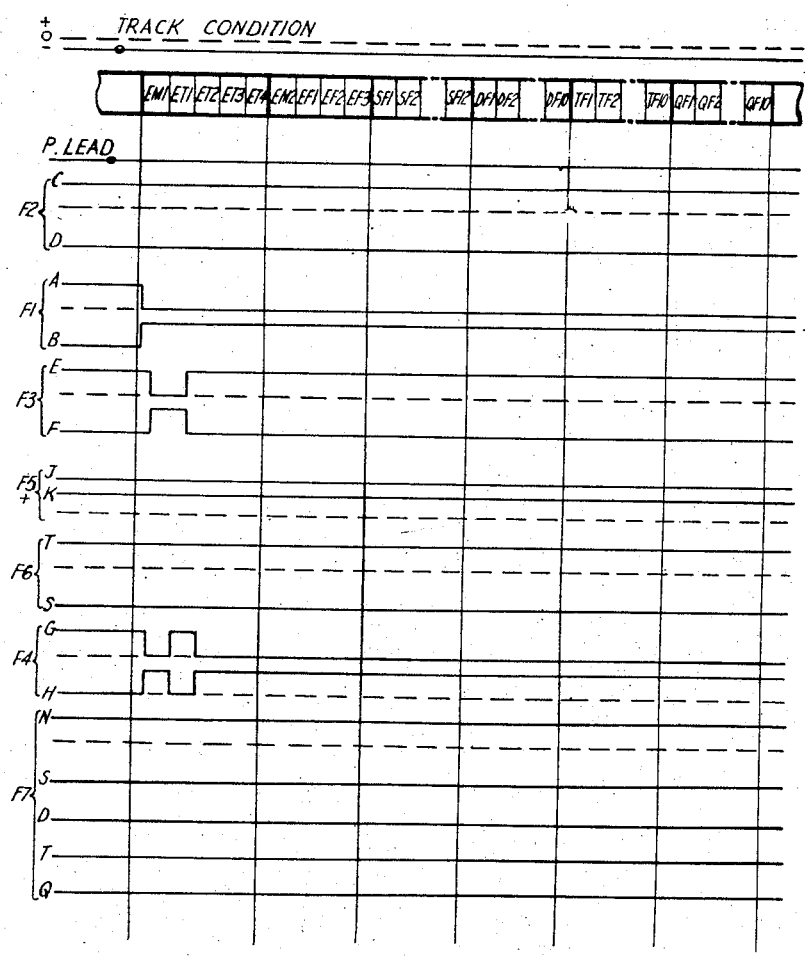
Figure 10:
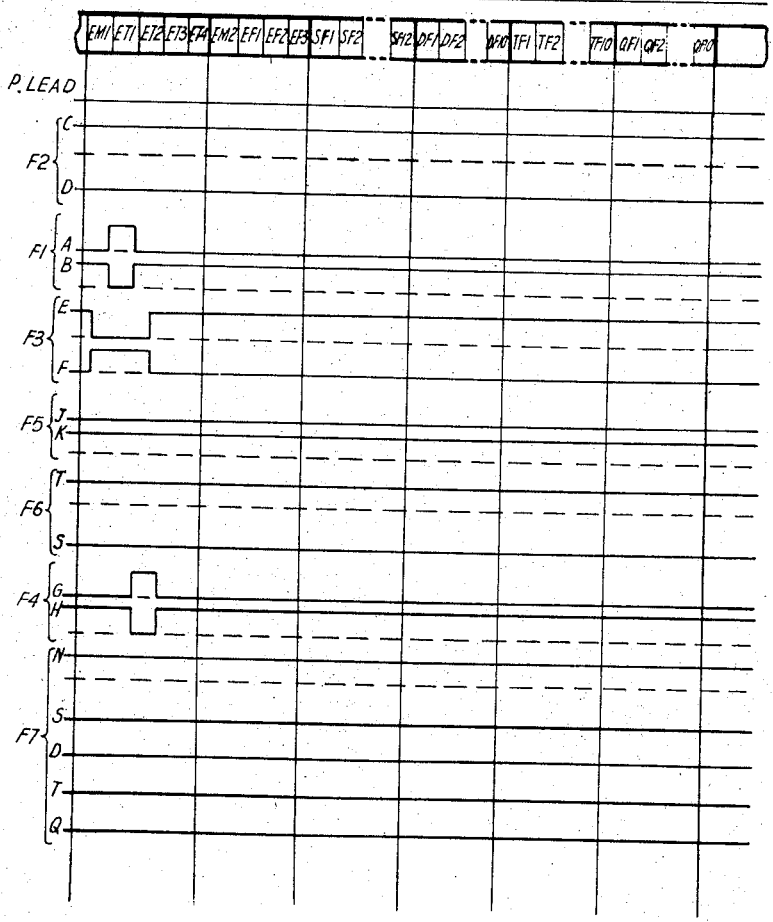

Figs. 9 and 10: no meter or track conditions exist.

Figure 11:
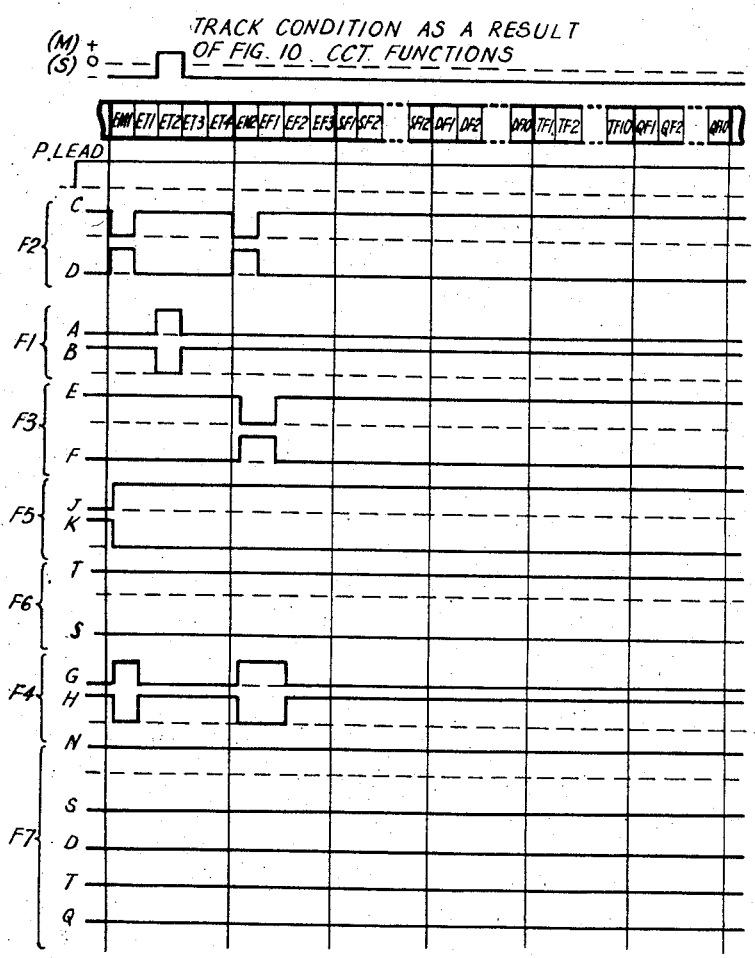
Figure 12:
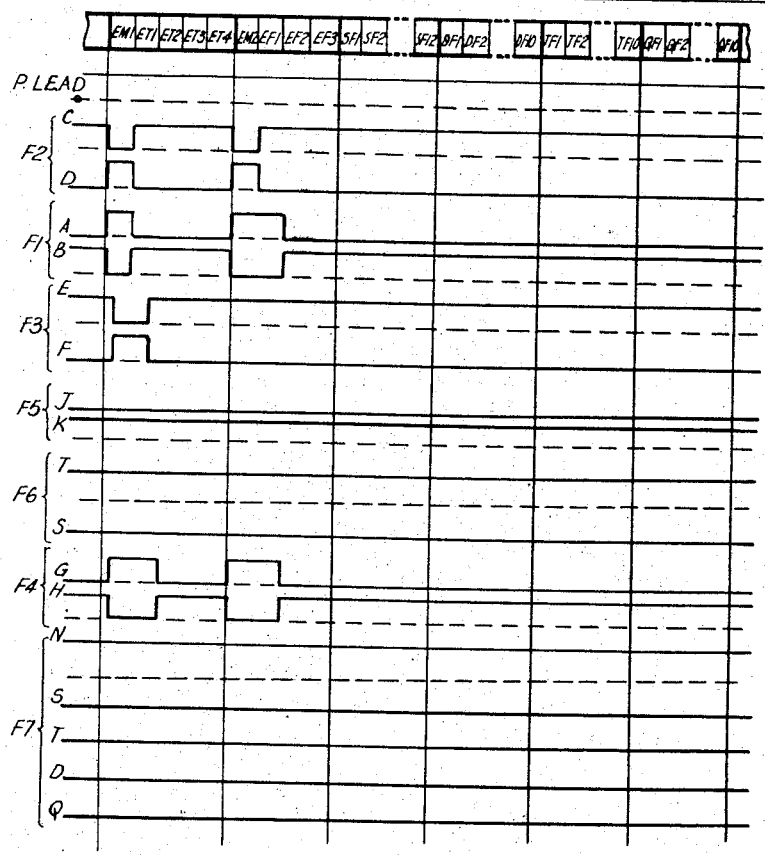

Figs. 11 and 12: the first meter pulse of a double fee call appears on the "P lead."

Figure 13:
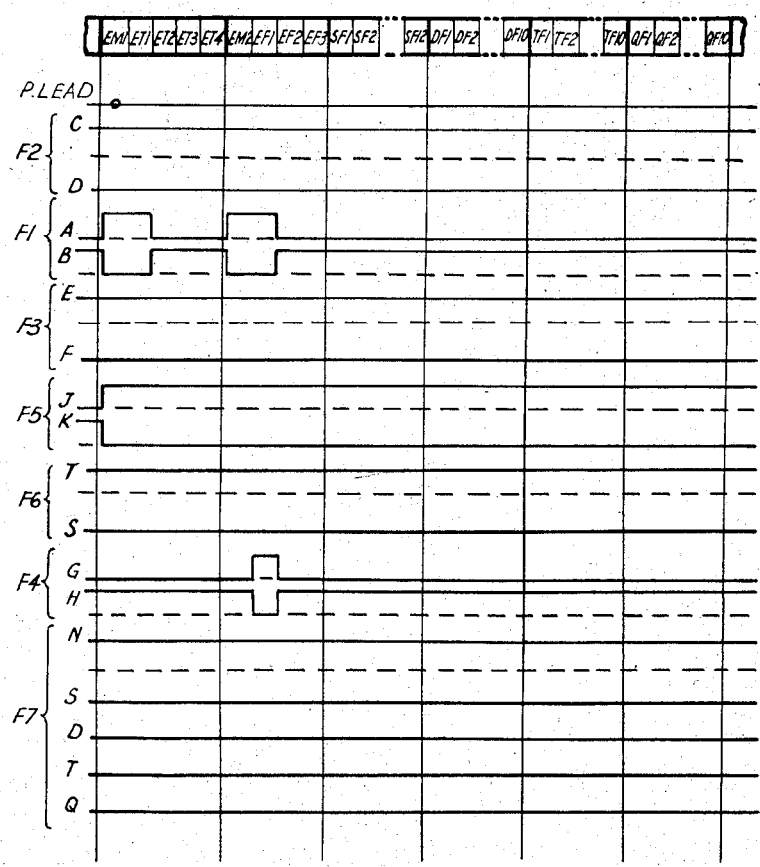
Figure 14:
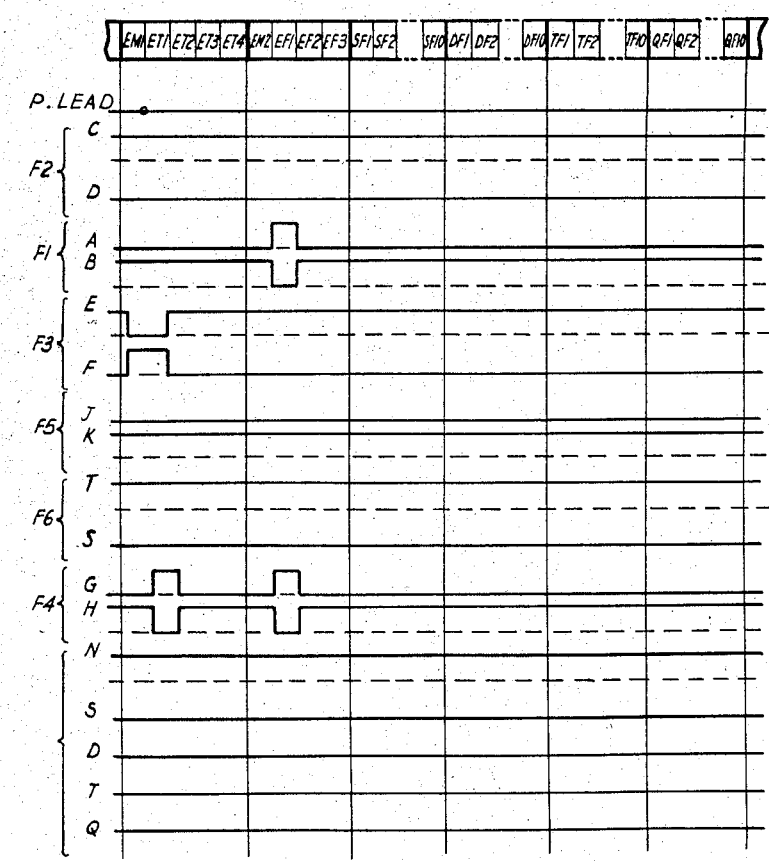

Figs. 13 and 14: pause between first and second meter pulse.

Figure 15:
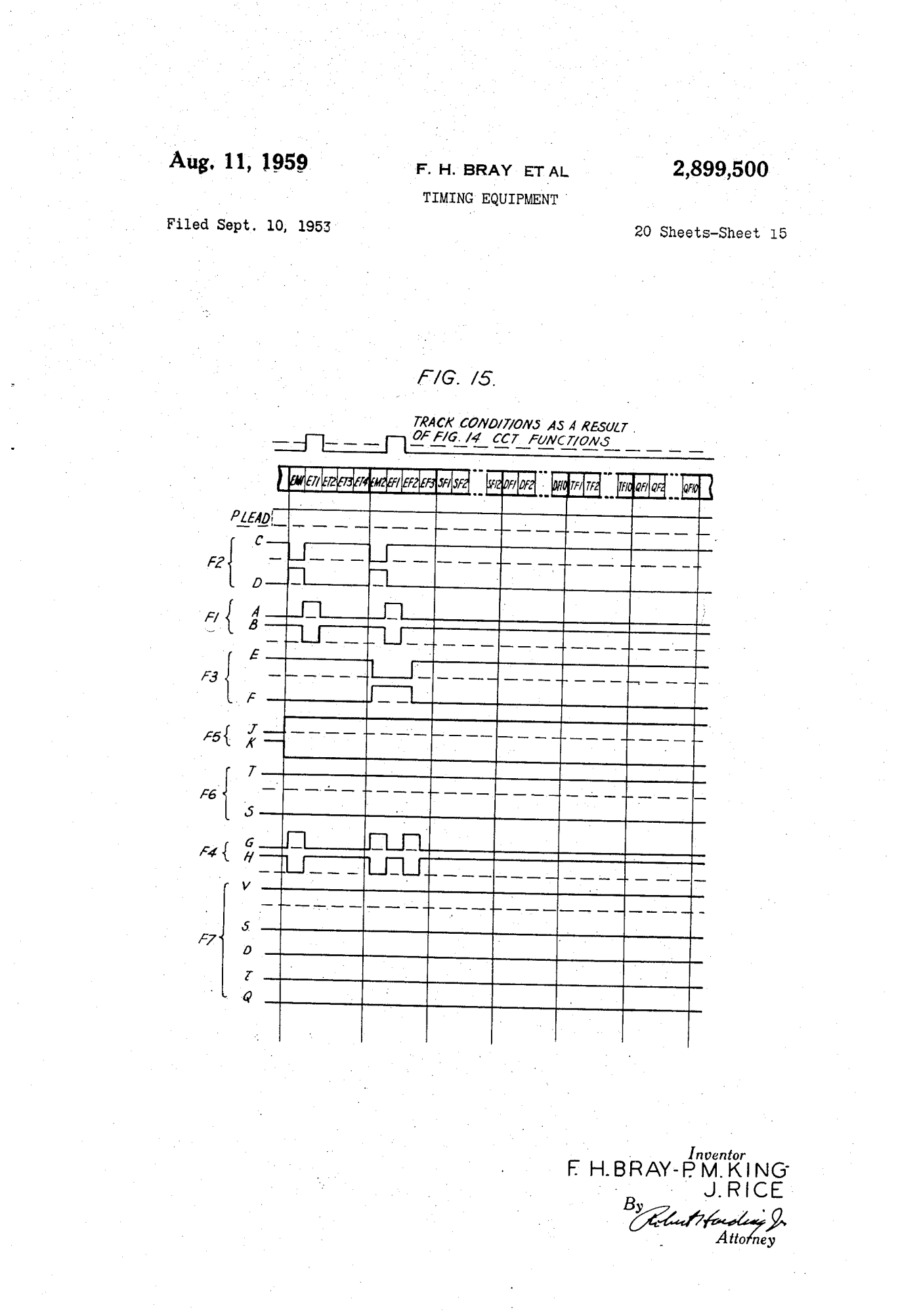
Figure 16:
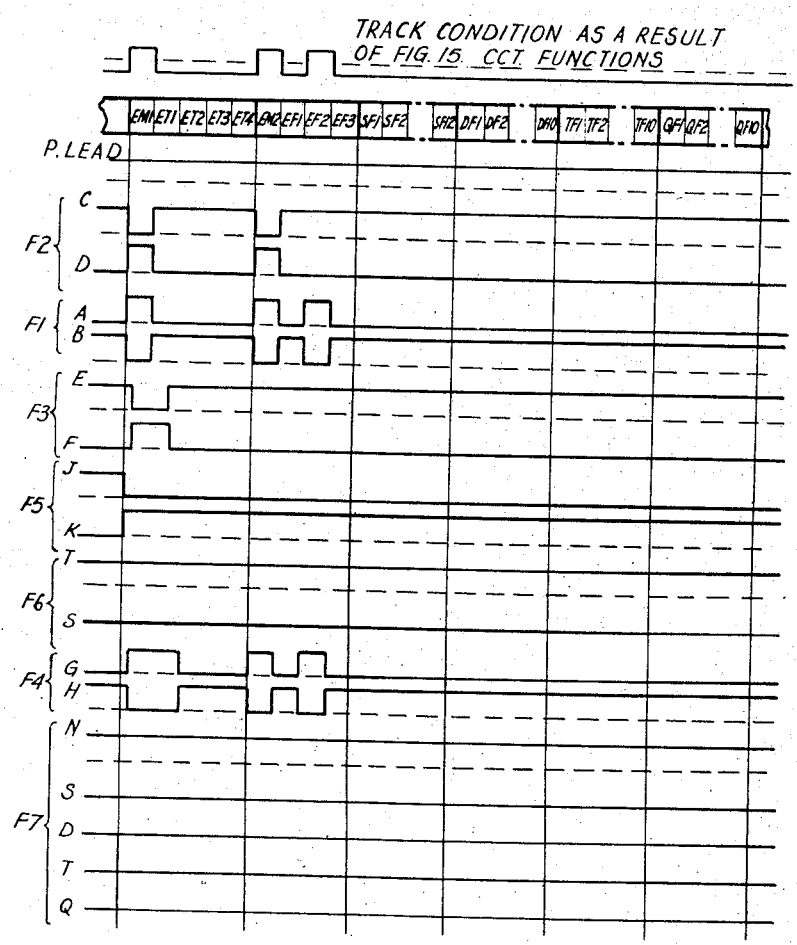

Figs. 15 and 16: second meter pulse appears.

Figure 17:
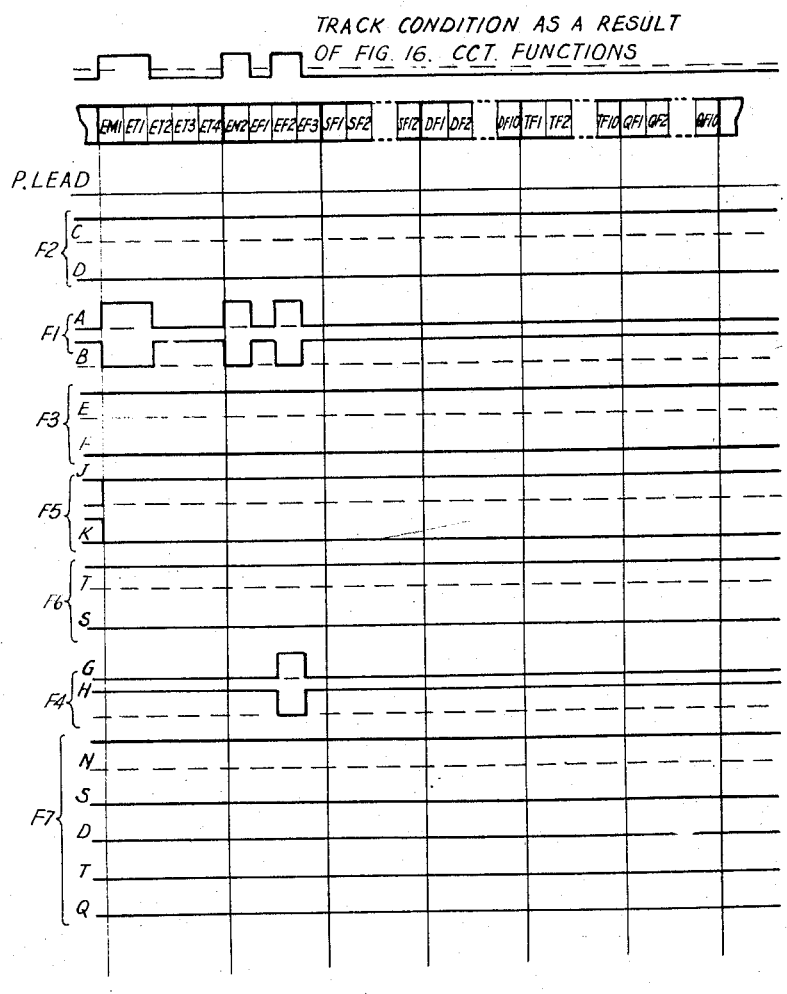
Figure 18:
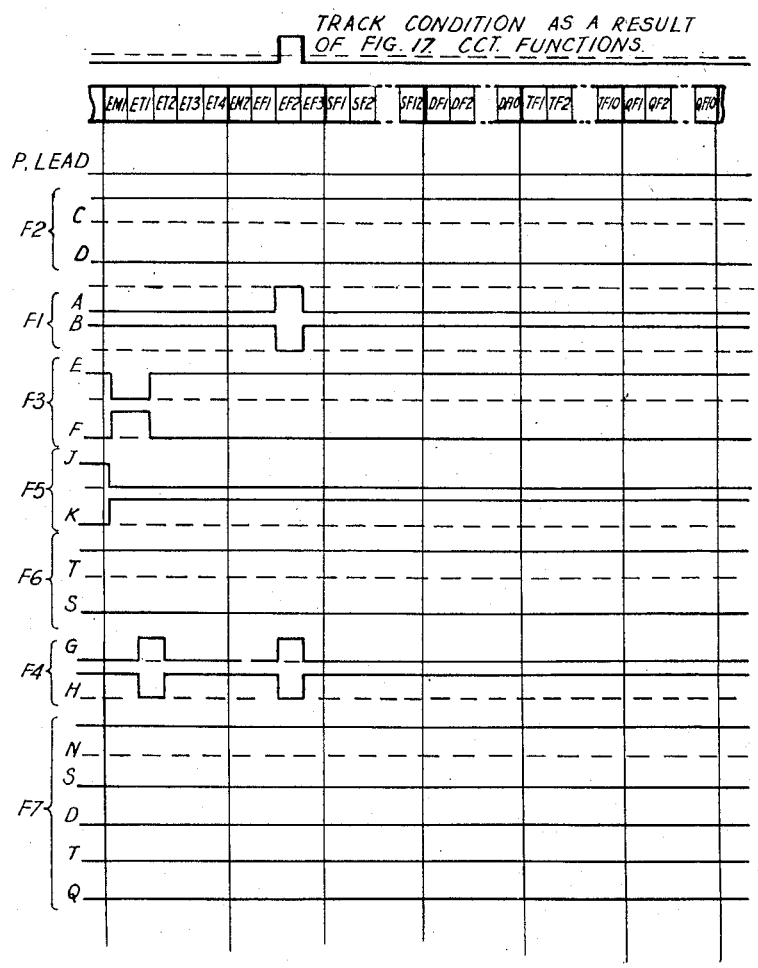

Figs. 17 and 18: second meter pulse ceases.

Figure 19:
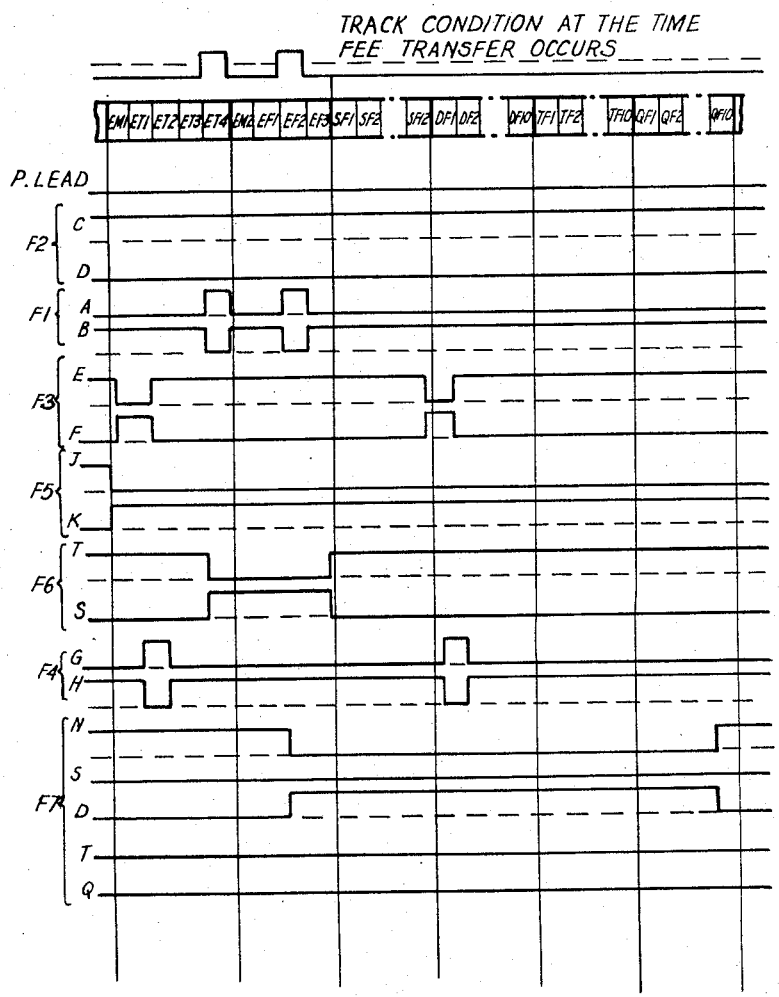
Figure 20:
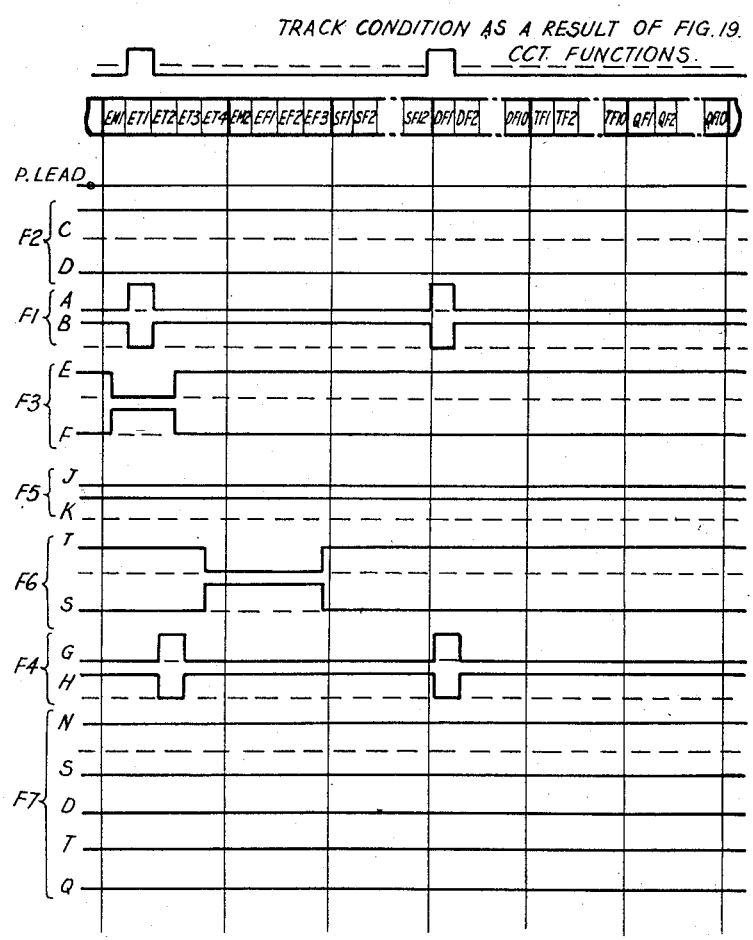

Figs. 19 and 20: transfer of information into the permanent store takes place.

PN is the position pulse used to gate subscribers line circuit N into section N on the magnetic drum, and it will be assumed for the purpose of this explanation that pulse PN is operative each time the track section is passing at the read head. This pulse will be derived with others of Figs. 1 and 2 corresponding to the other sections of a track from a toothed track on the drum, each tooth covering a section.

Normal condition (i.e. no metering)

At time tm1 gate G1 will cause F2 to test the P lead of the particular subscribers line circuit being gated in by the position pulse PN. Since there is no metering condition present, F2 will remain conducting at F2C. Also element EM1 will cause F1 to conduct at F1B, indicating that the track condition is "0." With pulse tm1 coincident with F2C and F1B, gate G18 will conduct, in turn causing F5 to conduct at F5K, thus indicating no transition of P lead condition. At the time of pulse t1, this pulse coinciding with tm1 and F2C, causes gate G25 to conduct, and in turn F4 to conduct at F4H, causing a "0" to be recorded. Thus the fact that no meter condition existed on the P lead has caused the special first element EM1 of the timing section to be repeated as a "0." Pulse t1 in conjunction with F5K will also cause F3F to conduct via gate G4. This circuit element prepares the appropriate gates for the addition of one to the timing elements. It will not cause any circuit function at time tm1, as its associated gates (G21, G24) in the timing section (Fig. 5) require waveform WT and WF, respectively. At the time t2 no circuit functions take place, gate G10 in particular being held off by Wm1.

At the following time of element ET1, F1 will be at F1B, pulse tm1 has ceased and waveform WT is operative. Pulse t1 becoming coincident with WT, F3F and F1B will cause gate G21 to conduct, in turn causing F4 to change over to F4G, and to record a "1." The fact that F1B was conducting showed that the track condition was "0," but due to F3F conducting this has been recorded as "1," fulfilling the condition for binary addition (i.e. reversing all elements up to, and including the first 0). Thus with F1 at F1B because of the 1st "0," and Wm1 present, indicating that the special element Em1 has passed, Wm1, Wm2, F1B and pulse t2 cause gate G10 to conduct, resetting F3 to F3E conducting. Timing elements ET2, ET3 and ET4, will keep F1 at F1B, but with F3 at F3E, at the time of t1 during each element, gate G26 will cause F4 to re-record "0."

At element ET4 pulse tt will occur, but as at that time F1 will be at F1B, no circuit action will take place. Hence at the end of the timing section the track condition will be as in Fig. 10, i.e. the special element Em1 will be "0," and "1" has been added to the timing elements ET1, 2, 3 and 4.

The timing section is now followed by the temporary store. Master control waves, WT and tm1 have ceased and their associated gates become inoperative, the circuit being controlled by tm2 and WF.

At time tm2, F2 again tests the condition of the P lead, but this time via gate G2, and as for the timing section, F2 remains at F2C. Element Em2 is a "0," so F1 will be at F1B. The temporary fee store is only required to operate if there is a condition on the P lead, but with no condition, the circuit operation is as follows: Pulse t1 becoming coincident with F2C, tm2 causes the special first element EM2 to be recorded as a "0," via gate G29. The addition circuit will not be initiated as gate G5 requires that F2 be at F2D, i.e. a meter pulse on. Hence elements EF1, EF2, EF3, will be recorded unchanged. In this case as they are "0," F1 will be at F1B, and at time t1 of each element, gate G30 will cause F4 to conduct at F4H recording a "0." The track condition at the end of the temporary fee store will be as Fig. 10, i.e. all "0." As there are no conditions in the temporary fee store, no further circuit operations can be initiated, and all the permanent store conditions will be recorded unchanged, via gates G30 and G23. As the permanent fee stores are all at "0," in actual fact only gate G30 will be operative. The circuit element waveforms are shown in Fig. 9.

Assuming that still no meter pulse has occurred when this particular track section appears for the second time, the track condition will be as for Fig. 10. The circuit element waveforms are shown on the same drawing. Using the same circuit elements as before, special element Em1 will be repeated as a "0," F3 set to F3F, F5 to F5K and F2 will be at F2C. The appearance of element ET1, will cause F1 to change over to F1A, and t1 coinciding with F1A, F3F and WT will cause gate G27 to conduct, and in turn F4 to record a "0" at F4H. At time t2 gate G10 will not conduct due to F1 being at F1A. Element ET2 appearing will cause F1 to change over to F1B, and at t1, coincidence with WT, F1B and F3F will cause gate G21 to conduct, changing over F4 to F4G and recording a "1." The condition for the addition of "1" has now been fulfilled and at t2 gate G10 resets F3 to F3E, as before. The circuit operation now becomes identical with that described during the first cycle, until this particular track section has passed. Thus it will be seen that during normal or "idling" operation the counting of drum revolutions which are used for the timing continues.

Arrival of metering pulse for a double fee call

Assume now that the first pulse of a double fee appears on the particular subscriber's P lead. As already assumed, this particular P lead is the lead PN. The first cycle of operation is shown in Fig. 11 together with the track condition after the previous two cycles. A condition on the P lead, becoming coincident with the position pulse, prepares gates G1 and G2 for operation. The first control pulse being tm1, gate G1 opens causing F2 to conduct at F2D. Gate G3 is held off at this time by WM1. Element EM1 will cause F1 to be conducting at F1B, and there being a transition of P lead condition, tm1 coincident with F1B and F2D causes F5 to change over to F5J. This prevents F3 from being changed over to F3F. At time $t1$, this pulse being coincident with $tm1$ and F2D causes gate G19 to conduct and consequently F4G to record "1." The special element EM1 will remain at "1" as long as the P lead condition persists. The 1st timing element ET1 of the timing section appears and with it waveform WT. With the appearance of WT gate G19 becomes inoperative, and at $t1$, WT and F5J cause gate G28 to conduct and in turn F4H to record a "0." This gate will then remain conducting as long as WT persists, and at time $t1$ each element will return to "0," thus erasing any previous intelligence. During this erasure neither F3F nor F5K will be conducting; hence gates G21, G27, G20 and G26 will be inoperative. The timing section of the track having passed, it leaves the track condition such that the special element EM1 is at "1," and the remaining elements at "0." At element ET1 waveform WM1 appears resetting F2 to F2C via gate G3.

The temporary store now follows, and as a metering condition exists it is desirable to record this fact once only in the store. The counting unit used, is like that described in the application, Serial No. 289,383, referred to above, and involves the use of a first element (EM2) known as a "chalk mark." The method briefly is that a "1" is added to the chalk mark element, and a "1" to the remaining elements. While the meter pulse persists the chalk mark will prevent any further addition into the temporary fee store. When the pulse ceases the chalk mark is removed, but leaving the "1" stored in the remaining elements.

If another meter pulse occurs before fee transfer is initiated, the chalk mark is re-added, and "1" is added to the unit which was already stored. At the end of the second pulse the chalk mark is again removed, leaving the remaining elements with "2" stored. The addition is in binary form, hence 3 elements EF1, 2 and 3, can store 7 meter pulses, although facilities are only available to use up to 4.

With element EM2 at the read head, F1 will be at F1B. Gate $G_2$ conducts, causing $F_2$ to change over to $F_2D$, and with F5 still at F5J, at the time $t1$ the following circuit functions take place. Pulse $t1$ coincident with $tm2$ and F2D causes gate G22 to conduct and consequently F4 to conduct at F4G, recording a "1," i.e. the "chalk mark." At the same time $t1$ being coincident with $tm2$, F1B and F2D causes gate G5 to conduct and hence F3 to change over to F3F conducting. The fact that F3F conducts at $t1$ will not cause any circuit operation, as the temporary fee section gates associated with F3 require WF waveform to operate.

The chalk mark has now been added and EF1 element appears, this will be a "0," and hence F1 will be at F1B. Pulse $tm2$ ceases and waveform WF commences, also waveform WM2 reappears. The reappearance of WM2 causes gate G3 to conduct and reset F2 to F2C, and prepares gate G10 to reset F3. Pulse $t1$ coincident with F3F, F1B and WF causes gate G24 to conduct and hence a "1" to be recorded. As this is the 1st "0," by the rule of addition F3 must now be reset. At time $t2$ gate G10 conducts resetting F3 to F3E. The remaining two elements EF2 and EF3 then operate F4, via gates G23 and G30, although as these two elements are "0," only gate G30 will be operative. The track condition is such that EM2 is now a "1," and "1" has been added to the store elements, and this is shown in Fig. 12.

Assume now the drum takes another cycle with the meter pulse still on, see Fig. 12. At element EM1, and time $tm1$, F2 changes over to F2D. The element EM1 is now a "1," and will cause F1 to conduct at F1A; hence when $tm1$, F1A and F2D become coincident, gate G17 will conduct, and subsequently F5K. This denotes that the P lead is stable. At time $t1$, conditions $tm1$, F5K and $t1$ cause gate G4 to conduct, and hence F3 to change over to F3F in preparation for adding "1" to the timing elements. Pulses $t1$ and $tm1$ with F2D also cause gate G19 to conduct, in turn causing F4 to record a "1" at F4G, thus the "1" on the element EM1 is repeated. The second element ET1 will cause F1 to conduct at F1B, and with F3 conducting at F3F, "1" will be added to the time store by the operation of G21. Nothing more will be added to the timing section or to the other sections during this rotation.

Assume now that the drum takes another cycle with the meter pulse still on. At element EM1 the operation already described is repeated and "1" is again recorded. The second element ET1 is a "1" and will cause F1 to conduct at F1A. At time $t1$, WT, F3F and F1A gate G27 will conduct and subsequently F4H to record a "0," reversing the element ET1 condition. Also during ET1, F2 is reset by gate G3 in the usual manner. Element ET2 then appears, causing F1 to change over to F1B, and at time $t1$, WT, F3F and F1B cause gate G21 to conduct causing F4 to record a "1." This completes the functions necessary for adding "1," and at $t2$ gate G10 conducts resetting F3 to F3E. Circuit operation to the end of the time store is then by usual control gates G20 and G26.

The temporary fee store has already recorded the meter pulse, so circuit operation for this section of the track is as follows. At $tm2$ gate G2 causes F2 to operate at F2D, but as the special element EM2 is now a "1," F1 will be at F1A. Hence the gate G5 controlling the addition circuit flip-flop F3 will be inoperative during $tm2$, whilst $tm2$, F2D and pulse $t1$, ensure that the chalk mark is re-recorded via gate G22. At element EF1 pulse $tm2$ will have ceased, so gate G5 cannot operate, and the track intelligence is repeated by gates G23 and G30 to the appropriate sides of F4. As the time store has not reached a point where transfer can take place, the gates G23 and G30 will repeat the permanent store's intelligence unchanged. The track condition is now as shown in Fig. 13.

Assume now that the first meter pulse has ceased; the circuit waveforms are shown in Fig. 13, the circuit operation being as follows:

When element EM1 occurs, there will be no condition on the P lead and hence F2 will be at F2C. Due to the fact that in the previous cycle a meter condition existed, EM1 was a "1"; therefore F1 will be at F1A. Hence F1A, F2C and $tm1$ cause gate G16 to conduct, and consequently F5 to change over to F5J, denoting a transition of the P lead condition. The effect of F5J operating is to block the operation of gate G4, and thereby F3, thus inhibiting the addition circuit. At time $t1$ this pulse, coincident with $tm1$ and F2C, causes gate G25 to conduct and subsequently F4H to record a "0." This has removed the "1" from element EM1, which will now remain as "0," until another meter pulse occurs. During the next element ET1, pulse $tm1$ ceases and WT appears, and at time $t1$, of each element, F5J and WT will cause F4 to record a "0," thus erasing the time store intelligence. Gates G21, G20, G26 and G27 will be inoperative due to the fact that neither F5K or F3F is present. By these means at the end of the time store, the special first element EM1 has been changed to "0," and the remaining intelligence erased.

The meter condition having ceased, it is now desirable to remove the "chalk mark" from the temporary fee store. F1 will be at F1A due to element EM2, F2 will be at F2C, at F5 and F5J. Once again the addition circuit is inhibited at gate G5, by virtue of F1A, but at time $t1$, pulse $t1$, $tm2$ and F2C cause gate G29 to conduct, and F4 to record a "0," erasing the chalk mark. As element EM2 passes, $tm2$ ceases and gate G29 becomes ineffective. At element EF1, F3 will remain at F3E, WF appears and the track intelligence denoted by F1 is repeated unchanged by F4 and gates G23 and G30, until the end of the track section. Thus at end of the 1st cycle, the temporary fee store has no chalk mark and "1" is stored in the remaining elements, the track condition being shown in Fig. 14.

During the second revolution of the drum the time store will add "1," and the temporary fee store will remain unchanged, the circuit operation being identical with Fig. 9, except that now the temporary fee store contains "1."

Assume now the second meter pulse arrives. By methods previously described, at element EM1, F1 will be at F1B, F2 at F2D, and F5 will change over to F5J. As before, this will cause "1" to be added for the first element EM1 and erase the previous timing. In the temporary fee section the chalk mark will be re-introduced and "1" added to the already existing unit. These circuit operations use the same gates and are identical with the circuit functions described for the 1st pulse. Thus at the end of the first cycle the timing store has the 1st element "1," the timing elements re-set to "0," and the temporary fee store has a chalk mark added and the store elements contain intelligence in the form of binary "2" indicating two pulses. The track condition is shown in Fig. 16, and the circuit element waveforms in Fig. 15. The waveforms for another cycle of operation are shown in Fig. 16.

At the end of the second pulse the track conditions will be as Fig. 17. Figs. 17 and 18 show two cycles after the second pulse has ceased. Operation for Figs. 16, 17 and 18 are identical, with those described for Figs. 12, 13 and 14, except that the temporary fee store contains intelligence, indicative of a double fee.

Assuming now no further P lead transitions occur, the timing section will continue adding "1" for each revolution, and supposing each drum revolution takes 100 ms. then each unit added is a direct indication that this time has elapsed. Hence, when the drum has completed 8 revolutions, binary 8 will be stored in the time store. Binary 8 is the first value which will cause a "1" to be stored on element ET4. With the maximum expected variation in meter pulse lengths, it is reasonable to assume that if no P lead transitions have occurred in 800 ms., then no more will occur in a given sequence of meter pulses, and that the temporary fee store intelligence should be transferred to the appropriate permanent store. Thus when ET4 causes F1 to conduct at F1A, this operation, coinciding with pulse $tt$, initiates the fee transfer in the following manner, Fig. 19 showing the cycle of operations when this stage is reached:

Track element ET4 will cause F1 to be at F1A, and pulse $tt$, coinciding with F1A causes gate G36 to conduct and consequently F6 to conduct at F6S. The function of F6 is to transfer the information from the temporary fee store, to the temporary fee memory which it does in the following manner: The binary pattern set up on elements EF1, EF2, EF3, will be detected by F1. Pulses $tf1$, $tf2$ and $tf3$ in conjunction with F1A, cause the section of F7, representing the decimal equivalent of the binary pattern to conduct. The same time as the intelligence is transferred from the temporary store elements, it is also erased; thus on the completion of transfer, the temporary fee store elements are all at "0."

The binary pattern on the elements EF1, 2 and 3 is 010; hence as the drum rotates, F1 will conduct at F1B F1A and again at F1B. At the time of element $tm2$, this pulse being coincident with F2C and $t1$, gate G29 conducts and consequently F4 records "0" at F4H. With element EF1 present, F4H will still conduct due to gate G30, no erasure being necessary as the track condition was already "0." Pulse $tf1$ will cause no function of F7, via gate G32 due to F1 being at F1B.

Element EF2 will be a "1"; hence $tf2$, F6S, F7N and F1A will cause section D to conduct. The fact that F1A is conducting would normally try to change over F4 to F4G via gate G23, but due to F6T, the gate will be inoperative; hence F4 will remain at F4H, and the intelligence erased. Element EF3 and $tf3$ will cause no further circuit operation as F1 is at F1B. The circuit condition at EF3 is then, that the track intelligence has been erased and F7 is operated in such a manner, that its output from D is direct indication to which permanent store "1" shall be added.

For completeness, with the circuit operation as visualised at the moment, there are four separate conditions which will operate F7 i.e., single, double, treble or quadruple fee intelligence stored in the temporary fee store.

For single fee elements, EF1, EF2 and EF3 will cause F1 to conduct at F1A, F1B, F1B. The section N is normally conducting. Hence at EF1, $tf1$ and F1A and F6S operate gate G32, and section S only fires, its output initiating the addition of "1" into the single-fee store.

For a double fee F1 will be at F1B, F1A, F1B hence F1A, $tf2$, F6S and F7N cause gate G33 and consequently section D of F7 to conduct. F7N indicates that at $tf1$, F1 was at F1B; hence the track intelligence was binary "2" i.e., 010. Section D output initiates the addition of "1" to the double fee store.

In the case of the treble fee call, for binary "3," both EF1 and EF2 will be at "1"; hence F1 will be at F1A, F1A, and F1B. At $tf1$, section S will conduct, as for single fee, but at $tf2$, F7N is inoperative; hence $tf2$, F7S and F1A cause section T to conduct, thus initiating the addition of "1" into treble fee store.

For the quadruple fee, binary four will be EF3 only at "1," hence F1 will be F1B, F1B, F1A. The two first elements will therefore cause gates G32, G33 and G34 to be inoperative. At the time of pulse $tf3$, F6S and F1A will cause gate G35 to conduct and initiate the addition of "1" into the quadruple fee store. There is no reason why this circuit should be limited to four conditions, and, depending upon the maximum value of the binary number to be stored in the temporary fee store, sections can be added to F7. Continuing with the transfer of the double fee, at $tf3$ and time $t2$, gate G37 conducts, resetting F6 to F6T. Hence as the final section of the temporary fee store passes, gate G23 is unblocked, and F4 and its associated fee section gates will be normal. If the fee had been single, as previously explained, $tf3$ has a double purpose, and at $t2$ and with F7S, $tf3$ would have caused G6 to operate, causing F3F to conduct and to add "1" in the manner previously explained. The double fee in question, has caused F7D to conduct, and at time $t2$ of the element SF12 of the single-fee store, $tdf$ causes gate G7 to conduct, and F3F to add "1" to the double fee store. For treble fee, $ttf$ and F7T operate gate G8, and for quadruple fee, $tqf$ and F7Q operate gate G9, the two gates initiating the operation of F3F and hence the addition of "1" into the appropriate store.

The track condition is shown in Fig. 20.

Also at the time of the final element, the pulse $te$, denoting the end of the track section, causes F7 to be reset at F7N.

Gates G11, G12, G13 and G14 are used to reset F3 should all the elements in one store be at "1." If this were the case, then gate G10 would be inoperative, and "1" would be added to the next store. Thus, if addition is made to the single fee store at the time of the final element and F3 is not reset, $tdf$ which occurs in coincidence with this element will at $t2$ cause gate G11 to conduct, and in consequence F3E, thus overcoming the above problem.

F7D and $ttf$ cover this function for double fee at gate G12. F7T and $tqf$ cover the treble fee section at gate G13, and $te$ resets F3 for the quadruple fee. If no limit were placed on the amount of meter pulses to be received by the temporary fee store in one operation, then a gate of this kind may be required for this section of the track.

At the end of the transfer cycle, the temporary fee store is at "0," and the appropriate permanent record store greater by "1." The circuit is ready for the addition of another set of meter pulses.

While the principles of the invention have been described above in connection with specific embodiments, and particular modifications thereof, it is to be clearly understood that this description is made only by way of example and not as a limitation on the scope of the invention.

What we claim is:

1. Timing equipment comprising a store having a plurality of elements, means for examining said store periodically, element by element, means external with respect to said store capable of assuming either of two conditions, and of producing a signal when in one of said conditions, a two-condition device, means operative only when said examining means is examining the first element of said store and responsive to said signal for causing said two-condition device to assume one of its conditions, means operative when said examining means is examining the rest of said elements for causing said two-condition device to assume the other of its conditions, a control circuit connected with said examining means and with said two-condition device and comprising means responsive to said two-condition device assuming its one condition when the first element of said store is examined for counting the number of successive examinations of said store during the time said signal is produced by said external means.

2. Timing equipment which comprises a number of stores each having a plurality of elements, means for examining said stores periodically and successively, element by element, a number of means external to said stores and said examining means each being capable of assuming either of two conditions and to produce a signal when in one of said conditions and each corresponding to one of said stores, a two-condition device, means operative only when said examining means is examining the first element of each of said stores and responsive to the signal produced by the external means corresponding to said store for causing said two-condition device to assume one of its conditions, means operative when said examining means is examining the rest of the elements of each store for causing said two-condition device to assume the other of its conditions, a control circuit connected with said store examining means and with said two-condition device and comprising means responsive to said two-condition device assuming its one condition when the first element of a store is examined for counting the number of successive examinations of said store during the time said signal is produced by the external means corresponding to said store.

3. Timing equipment comprising a store formed by an endless track of magnetic material having a plurality of elements in which intelligence can be recorded, recording and reading means mounted in operative relation to said track, said track and recording and reading means being relatively movable, whereby said track is repeatedly examined element by element by said recording and reading means, means corresponding to a predetermined portion of said track and capable of assuming either of conditions and of producing a signal when in one of said conditions, a two-condition device, means operative only when said recording and reading means is examining the first element of said store and responsive to said signal for causing said two-condition device to assume one of its conditions, means operative when said recording and reading means is examining the rest of said elements for causing said two-condition device to assume the other of its conditions, a control circuit connected with said recording and reading means and with said two-condition device and comprising means responsive to said two-condition device assuming its one condition when the first element of said store is examined by said recording and reading means for counting the number of successive examinations of said predetermined portions of said track by said recording and reading means during the time said signal is produced by said external means.

4. Timing equipment which comprises an endless track of magnetic material on which intelligence can be recorded, recording and reading means mounted in operative relation to said track, said track being movable with respect to said recording and reading means and being divided into a number of portions forming separate stores each having a plurality of elements which stores appear at said recording and reading means successively, whereby said stores are repeatedly examined by said recording and reading means, a number of means external with respect to said track and to said recording and reading means, said external means each capable of assuming either of two-conditions and each corresponding with one of said stores, each of said external means producing a signal when in one of said two-conditions, a two-condition device, means operative only when said recording and reading means is examining the first element of a store and responsive to the signal produced by the external means corresponding to said store for causing said two-condition device to assume one of its conditions, means operative when said recording and reading means is examining the rest of the elements in each store for causing said two-condition device to assume the other of its conditions, a control circuit connected with said recording and reading means and with said two-condition device and comprising means responsive to said two-condition device assuming its one condition when the first element of a store is examined by said recording and reading means for counting the number of successive examinations of the store corresponding to the external means which has caused said two-condition device to assume said one condition.

5. Timing equipment, as claimed in claim 1, in which the store comprises a control portion and a counting portion, the first element of said store being the control portion, and in which the control circuit comprises means responsive to the two-condition device assuming said one condition to cause a signal to be recorded in said control portion of said store indicating that said external means has assumed the condition which produces a signal, said counting means comprising means responsive to said examining means finding a signal recorded in said control portion of said store on the next examination of said store to record a count of one in said counting portion if said two-condition device is in said one condition at the same time, and means operable on each subsequent examination of said store if said examining means finds a signal recorded in said control portion of said store and said two-condition device is simultaneously in said one condition for increasing the recorded count in said counting portion by one.

6. Timing equipment, as claimed in claim 2, in which each store comprises a control portion and a counting portion, the first element of each store being the control portion, and in which the control circuit comprises means responsive to the two-condition device assuming said one condition to cause a signal to be recorded in said control portion of the store corresponding to the external means which caused said two-condition device to assume its one condition, indicating that said external means has assumed the condition which produces a signal, said counting means comprising means responsive to said examining means finding a signal recorded in said control portion of said store on the next examination of said store to record a count of one in said counting portion of said store if said two-condition device is in said one condition at the same time and means operable on each subsequent examination of said stores if said examining means finds a signal recorded in the control portion of a store and said two-condition device is simultaneously in said one condition for increasing the recorded count by one in the counting portion of said store.

7. Timing equipment, as claimed in claim 5, in which each count is recorded in binary notation, and in which the means for increasing the count by one comprises means responsive to the signals produced by the examining means when reading the recorded count, means responsive to the two-condition device being in the one condition, and means under control of both of said responsive means to reverse all digits up to and including the first binary zero in the counting portion of said store.

8. Timing equipment as claimed in claim 1, in which the control circuit comprises means responsive to the count assuming a predetermined value to cause a corresponding control operation.

References Cited in the file of this patent

UNITED STATES PATENTS

| 2,540,654 | Cohen | Feb. 6, 1951 |
| 2,675,427 | Newby | Apr. 13, 1954 |
| 2,680,239 | Daniels | June 1, 1954 |
| 2,700,755 | Burkhart | Jan. 25, 1955 |
| 2,790,599 | Chenus | Apr. 30, 1957 |
| 2,805,286 | Baker | Sept. 3, 1957 |

FOREIGN PATENTS

| 703,593 | Great Britain | Feb. 3, 1954 |

OTHER REFERENCES

"24 Digit Parallel Computer with Magnetic Drum Memory," by Engineering Research Assoc., 1949. Figs. 3.2–2, 3.3–4, and 3.3–5. Pages 27, 28 and title page.